(No Model.) 4 Sheets—Sheet 1.

A. J. C. GRAF.
COIN CONTROLLED MACHINE FOR INDICATING THE FORCE OF A BLOW OR PRESSURE.

No. 446,970. Patented Feb. 24, 1891.

Witnesses. Inventor.

(No Model.) 4 Sheets—Sheet 2.
A. J. C. GRAF.
COIN CONTROLLED MACHINE FOR INDICATING THE FORCE OF A BLOW OR PRESSURE.

No. 446,970. Patented Feb. 24, 1891.

Witnesses. Inventor.

(No Model.) 4 Sheets—Sheet 3.
A. J. C. GRAF.
COIN CONTROLLED MACHINE FOR INDICATING THE FORCE OF A BLOW OR PRESSURE.

No. 446,970. Patented Feb. 24, 1891.

(No Model.) 4 Sheets—Sheet 4.

A. J. C. GRAF.
COIN CONTROLLED MACHINE FOR INDICATING THE FORCE OF A BLOW OR PRESSURE.

No. 446,970. Patented Feb. 24, 1891.

Witnesses.

Inventor.

UNITED STATES PATENT OFFICE.

ADOLPH JOSEPH CARL GRAF, OF HAMBURG, GERMANY, ASSIGNOR TO CHARLES ARTHUR BARRETT AND ALFRED BARRETT, BOTH OF LONDON, ENGLAND.

COIN-CONTROLLED MACHINE FOR INDICATING THE FORCE OF A BLOW OR PRESSURE.

SPECIFICATION forming part of Letters Patent No. 446,970, dated February 24, 1891.

Application filed October 28, 1890. Serial No. 369,556. (No model.) Patented in Germany December 2, 1887, No. 43,724, and July 27, 1888, No. 45,937, and in England January 18, 1888, No. 812.

*To all whom it may concern:*

Be it known that I, ADOLPH JOSEPH CARL GRAF, a subject of the German Emperor, and a resident of Hamburg, in the German Empire, have invented certain new and useful Improvements in Coin-Controlled Machines for Indicating the Force of a Blow or Pressure in Exchange for a Prepaid Coin, (for which are secured Letters Patent in Germany, No. 43,724, dated December 2, 1887, and No. 45,937, dated July 27, 1888, and in England, No. 812, dated January 18, 1888,) of which the following is a specification.

This invention relates to improvements in apparatus for indicating the force of a blow or other pressure in exchange for a coin previously paid into said apparatus; and it consists in a novel combination of mechanisms, according to which the apparatus can only be worked if the prepaid coin be of a proper size, and which coin will be refunded if the force of the blow exceeds a certain limit.

The object of my invention is attained by the mechanisms illustrated in the accompanying drawings, in which—

Figure 1:
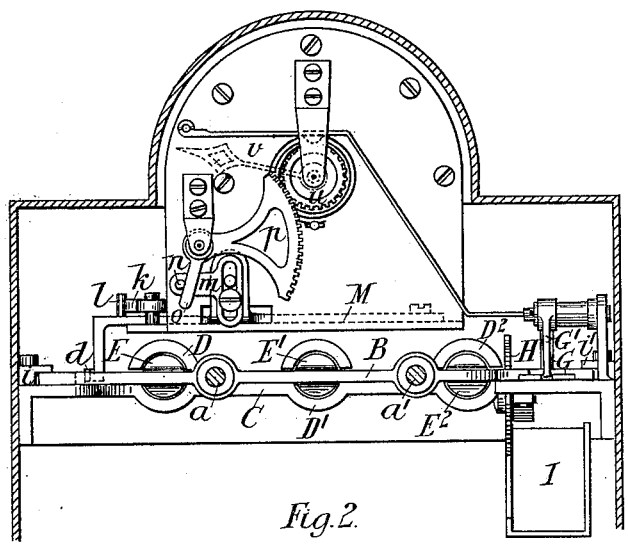
Figure 2:
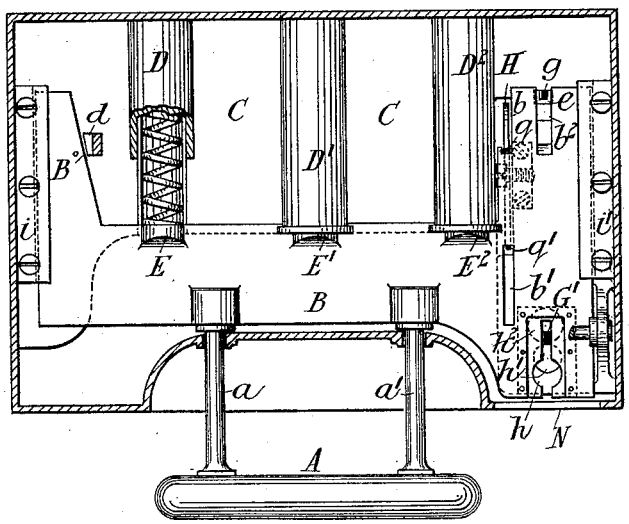
Figure 3:
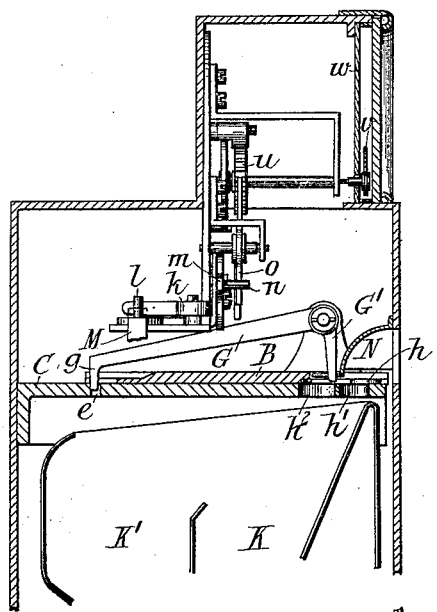
Figure 4:
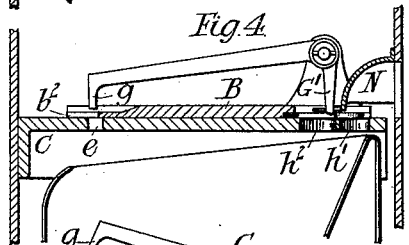
Figure 5:
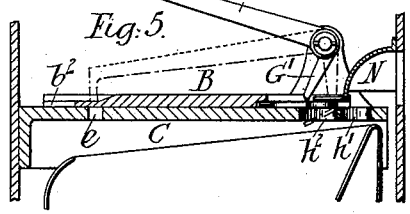
Figure 6:
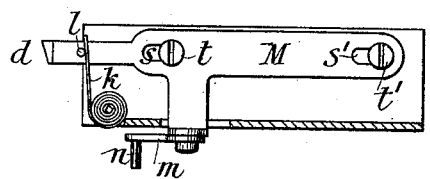
Figure 7:
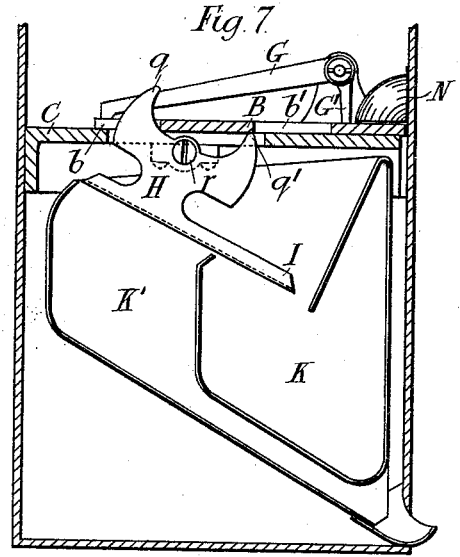
Figure 8:
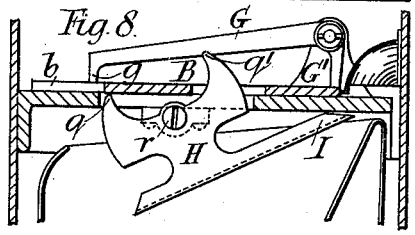
Figure 9:
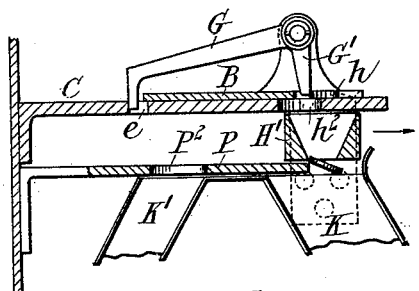
Figure 11:
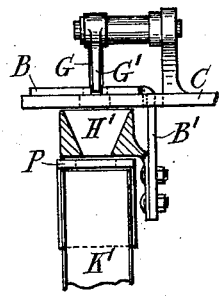
Figure 9A:
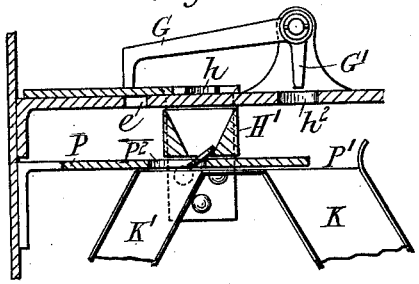
Figure 10:
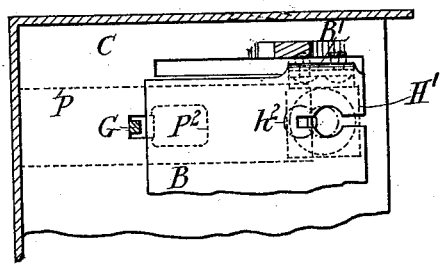

Figure 1 is a front elevation of the improved apparatus, partly in section, the front wall of the casing being removed. Fig. 2 is plan partly in section. Figs. 3 to 8 show the several working parts in different positions, as they are described hereinafter. Figs. 9 to 11 illustrate a modification of the apparatus.

Similar letters refer to similar parts throughout the several views.

The whole mechanism is entirely inclosed within a case, while a handle or buffer A, upon which the human or other force is exerted, outside the case transmits the pressure to the mechanism hereinafter described. This handle A is carried by arms $a$ $a'$, extending outside the case, and is connected with a slide B, guided inside the apparatus in the direction of the pressure by the lugs $i$ $i'$. It is adapted to act through pistons E E' $E^2$ against the springs D D' $D^2$ of definite resistance. This slide B is provided with an aperture $h$ of a given diameter to receive the coin through the receiver N, and when advancing toward the said springs the coin kept in the aperture $h$ of the said slide B advances at the same time, thereby touching an arm G' of a bell-crank lever G G', which serves to unlock the said slide-piece and to admit of its further movement toward the springs. The other arm G of this bell-crank lever, which is pivoted to brackets upon a fixed plate C beneath the said slide-piece, engages by a projection $e$ of the said fixed plate C, which latter forms the frame of the principal mechanism. In the event of a coin of too small a diameter being dropped into the apparatus it falls down through the frame C beneath the slide after having passed a hole $h'$ of a diameter somewhat less than that of the proper coin before reaching the arm G' of the bell-crank lever which locks the slide B. The motion of the slide B is stopped by the projection $g$ of the arm G of the bell-crank lever G G' engaging into the notch $e$ of the fixed plate or frame C. When the bell-crank lever G G' is unlocked by means of a coin of the right denomination, the said slide B can be moved farther in the direction of the pressure exerted upon the handle A until the aperture $h$, adapted to receive the coin, coincides with a second hole $h^2$ in the fixed plate or frame C, through which it falls upon a balance I, provided with a fork H, the arms $q$ $q'$ of which are designed to enter into either of the two notches $b$ $b'$ of the said slide B. The balance I, which provides a path for the coin duly paid, will be turned by the said slide by means of the aforesaid fork H in such a manner that the path of the coin will occupy a position which will either deliver it into the till K or eject it from the apparatus. When a given pressure is exceeded, the balance I will occupy the position shown by Fig. 8, when the coin slips down into a channel K', leading out of the apparatus, and the money will be refunded as a reward to the strong user, while in the event of this pressure not being attained the coin slips on the other end of the balance I, then in the position shown by Fig. 7, and falls into the till K, inside the case.

The degree of pressure exerted upon the handle is indicated by a gage device, (shown in Figs. 1, 3, and 6,) but which does not form part of my invention. The wedge-shaped edge B° of the slide B bears against a projection $d$ of a bar M, which is guided on the base-plate of the gage device by means of the studs $t\ t'$ and the slots $s\ s'$. This bar is provided with an adjustable arm $m$, the pin $n$ of which rests against an arm $o$ of the toothed segment $p$. By means of the pinion $u$ the movement imparted by the slide B is transmitted to the mechanism of the gage device and indicated by a pointer $v$ on the dial $w$. As soon as the handle A is released from pressure, the spring $k$, bearing against the stud $l$ of the bar M, will return the hand $v$ to zero.

The modification shown in Figs. 9 to 11 relates to the coin receiving and refunding devices. Instead of using the balance I a hopper H′ is firmly attached by an arm B′ to the slide B. When the coin is put in the aperture $h$ of the slide B, it drops into the hopper H′ as soon as the said aperture $h$ coincides with the hole $h^2$ in the fixed plate or frame C after the arm G of the bell-crank lever G G′ has been released from the notch $e$ of the plate C. By the motion of the slide B the hopper moves between the two fixed plates C and P, the latter being provided with the passages P′ and P², the former of which communicates with the till through the chute K, while the latter is opposite the upper opening of the chute K′, through which the coin, under certain conditions, is led out of the apparatus. When the aperture $h$ in the slide B is opposite the hole $h^2$, the hopper H′ has advanced so far that its lower mouth will be covered by the solid part of the plate P, between the passages P′ and P². In the event of the maximum pressure being exceeded the slide B and the hopper H′ will occupy the position illustrated in Fig. 9ª. The mouth of the hopper being then opposite the passage P², the coin will drop into the chute K′ and be refunded to the user, as above described. If, however, the maximum pressure is not attained, the mouth of the hopper H′ will not reach that position, and the coin will be kept within the hopper until the pressure exerted upon the handle is discontinued. On the return of the slide B, under the action of the springs D D′ D², into its original position, the mouth of the hopper H′ will pass the front edge P′ of the plate P, and the coin will drop through the chute K into the locked till in the case of the apparatus.

Having now particularly described and ascertained the nature of the said invention and in what manner the same is to be performed, I declare that what I claim is—

1. In an apparatus for indicating the force of a blow or other pressure in exchange for a given coin, the combination, with the movable slide B and with the springs D D′ D², upon which it acts, of the fixed plate C, having a notch $e$ therein, the bell-crank lever G G′, engaging with such notch, and a movable holder for the inserted coin actuated by said slide, the combination serving, as described, to deposit the coin within the case or to deliver it outside the same.

2. In an apparatus for indicating the force of a blow or other pressure in exchange for a given coin, the combination of the angle-lever G G′, which is adapted to unlock the slide B, acting upon a spring D D′ D², with the balance I, provided with the bifurcated arm H, substantially as and for the purpose specified.

3. The combination of the movable slide B, provided with a handle A, the pistons E E′ E², and the aperture $h$ with the springs D D′ D², the locking device consisting of the bell-crank lever G G′, engaging with the notch $e$ of the fixed plate C, and the coin-conducting device consisting of the balance I, engaging with the arms $q\ q'$ and with the notches $b\ b'$ of the slide B, all substantially as and for the purpose set forth.

In testimony that I claim the foregoing as my invention I have signed my name, in presence of two witnesses, this 27th day of June, 1890.

ADOLPH JOSEPH CARL GRAF.

Witnesses:
ALEXANDER SHECHE,
LUDWIG KÖNIG.